United States Patent [19]
Suzuki et al.

[11] Patent Number: 5,436,677
[45] Date of Patent: Jul. 25, 1995

[54] FOCUS VOLTAGE CONTROL APPARATUS

[75] Inventors: Isao Suzuki; Yasuhito Maeshima, both of Aichi, Japan

[73] Assignee: Sony Corporation, Tokyo, Japan

[21] Appl. No.: 183,355

[22] Filed: Jan. 19, 1994

[30] Foreign Application Priority Data

Feb. 3, 1993 [JP] Japan .................. 5-016478

[51] Int. Cl.⁶ .................. H04N 3/26; H04N 9/28
[52] U.S. Cl. .................. 348/806; 348/807; 315/382.1; 315/382
[58] Field of Search .............. 348/806, 807, 805, 744, 348/745, 746; H04N 3/26, 3/28; 315/382, 382.1, 368.11; 313/414, 412

[56] References Cited

U.S. PATENT DOCUMENTS

| | | | |
|---|---|---|---|
| 3,396,304 | 2/1966 | Wilson | 348/806 |
| 3,961,223 | 6/1976 | Ray et al. | 315/382 |
| 4,387,394 | 6/1983 | Powell | 315/382 |
| 4,633,144 | 12/1986 | McKiffen | 315/382 |
| 4,709,262 | 11/1987 | Spieth et al. | 348/807 |

FOREIGN PATENT DOCUMENTS 1478159 6/1977 United Kingdom .......... H04N 9/28

Primary Examiner—James J. Groody
Assistant Examiner—Michael H. Lee
Attorney, Agent, or Firm—Jay H. Maioli

[57] ABSTRACT

A focus voltage control apparatus adapted for a color CRT and capable of achieving a just focused state of any desired color even in monochromatic display. Red, green and blue color signals R, G, B are integrated per horizontal line period in integrating/peak holding circuits and then are weighted respectively in weight control circuits. Subsequently the maximum one of the color signals is detected in a comparator, and one of color selection signals SR, SG, SB is outputted in accordance with the result of such detection and then is supplied to focus voltage converters for the individual colors. A reference focus voltage refV is converted into a color focus voltage VR, VG or VB on the basis of the color selection signal SR, SG or SB for just focusing the color signal R, G or B. One of such focus voltages is supplied to a focus voltage driver and then is shifted to a higher-level focus voltage V which is supplied to a CRT, whereby the maximum one of the entire color signals included in the input video signal is displayed in a just focused state.

16 Claims, 4 Drawing Sheets

FIG. 3(A) REFERENCE FOCUS VOLTAGE refV AND COLOR FOCUS VOLTAGES VR, VG, VB

FIG. 3(B) FOCUS VOLTAGE V

FOCUS VOLTAGE CONTROL APPARATUS

BACKGROUND OF THE INVENTION

1. Field of the Invention

The present invention relates to a focus voltage control apparatus adapted for application to a color CRT (cathode-ray tube) display for use in computer graphics or the like.

2. Description of the Related Art

In a color CRT display for computer graphics, it is generally customary that a focus voltage is so set as to attain a just focused state with respect to a green color because of the fact that the human visual attribute is the most sensitive to green. Under the condition where green is seen distinctly, any other individual colors and compounds thereof are also seen relatively distinctly.

However, in such color CRT display where the focus voltage is set in conformity with green, there exists a problem that when any other single color than green, such as blue or red, is used for displaying characters or the like, the displayed image is rendered indistinct.

The focus voltage is adjustable, depending on any specific purpose of use of the color CRT display or the individual destination area thereof, by selectively changing the color to attain a desired just focused state, but high skill is necessary for such adjustment with another disadvantage that the required labor is not negligible.

SUMMARY OF THE INVENTION

The present invention has been accomplished in an attempt to solve the above problems observed in the prior art. Its object resides in providing an improved focus voltage control apparatus which is capable of achieving a distinct image with ease on a CRT display even in any single color other than green and ensuring a proper focus voltage adjustment easily in compliance with any specific purpose of use of the product or destination area thereof.

According to one aspect of the present invention, there is provided a focus voltage control apparatus which comprises circuits for integrating color signals in a predetermined period of an input color video signal, circuits for weighting the integrated color signals, a color signal comparator for comparing the weighted color signals and detecting the maximum one of the color signals, and a circuit for generating a focus voltage to exactly focus the color signal, thereby outputting the focus voltage required to attain a just focused state of the maximum color signal.

In the present invention, color signals R, G, B supplied from an R, G, B signal processor are inputted to integrating/peak holding circuits of a focus voltage controller, where the color signals are integrated every horizontal line period and then the integral values thereof are held.

The integral values R', G', B' thus held are supplied to weight control circuits so as to be weighted by coefficients $\alpha$, $\beta$, $\gamma$ respectively, and the weighted values are supplied to a comparator, where the values are mutually compared so that the maximum color signal is detected. And a color selection signal SR, SG or SB is outputted in accordance with the result of such comparison. In an undermentioned embodiment, the weighting coefficient $\beta$ for the green signal G is set to be approximately twice the coefficient $\alpha$ for the red signal R or the coefficient $\gamma$ for the blue signal B, whereby a white color is displayed distinctly.

The color selection signals SR, SG, SB are supplied respectively to red, green and blue focus voltage converters which also receive a reference focus voltage refV from a reference focus voltage generator. Color focus voltages VR, VG, VB for just focusing the color signals R, G, B are obtained through conversion in accordance with the color selection signals SR, SG, SB respectively. In the undermentioned embodiment, the reference focus voltage refV is set on the basis of the green focus voltage VG.

The color focus voltage VR, VG or VB is outputted from the focus voltage controller in response to the color selection signal SR, SG or SB obtained from the comparator and then is supplied to a focus voltage driver. Subsequently the focus voltage VR, VG or VB is shifted to a higher-level focus voltage V and then is supplied via a CRT driver to a CRT, whereby the maximum color signal included in the entire input video signal SA is focused exactly.

Furthermore, at the time of displaying an image in any compound color, it is possible in the present invention to select the desired just-focusable color by properly setting the weighting coefficients $\alpha$, $\beta$, $\gamma$.

As mentioned, the present invention has such an improved constitution that the color signals included in an input video signal are integrated in every predetermined period, and the integral values thereof are weighted respectively. And a focus voltage for attaining a just focused state of the maximum one of the weighted color signals is outputted.

Consequently, the invention is so advantageous that, even in the case of displaying a character for example in any single color on a color CRT for computer graphics or the like, the image can be displayed distinctly in a state where the desired color is just focused. And it is rendered possible, by changing the weighting coefficients for the colors, to change the just focusable color signal with ease in compliance with any specific purpose of use of the product or destination area thereof.

The above and other features and advantages of the present invention will become apparent from the following description which will be given with reference to the illustrative accompanying drawings.

DETAILED DESCRIPTION OF THE PREFERRED EMBODIMENT

Hereinafter the focus voltage control apparatus of the present invention will be described in detail with reference to the accompanying drawings which represent an exemplary case of applying the invention to a color CRT display for computer graphics.

Figure 1:
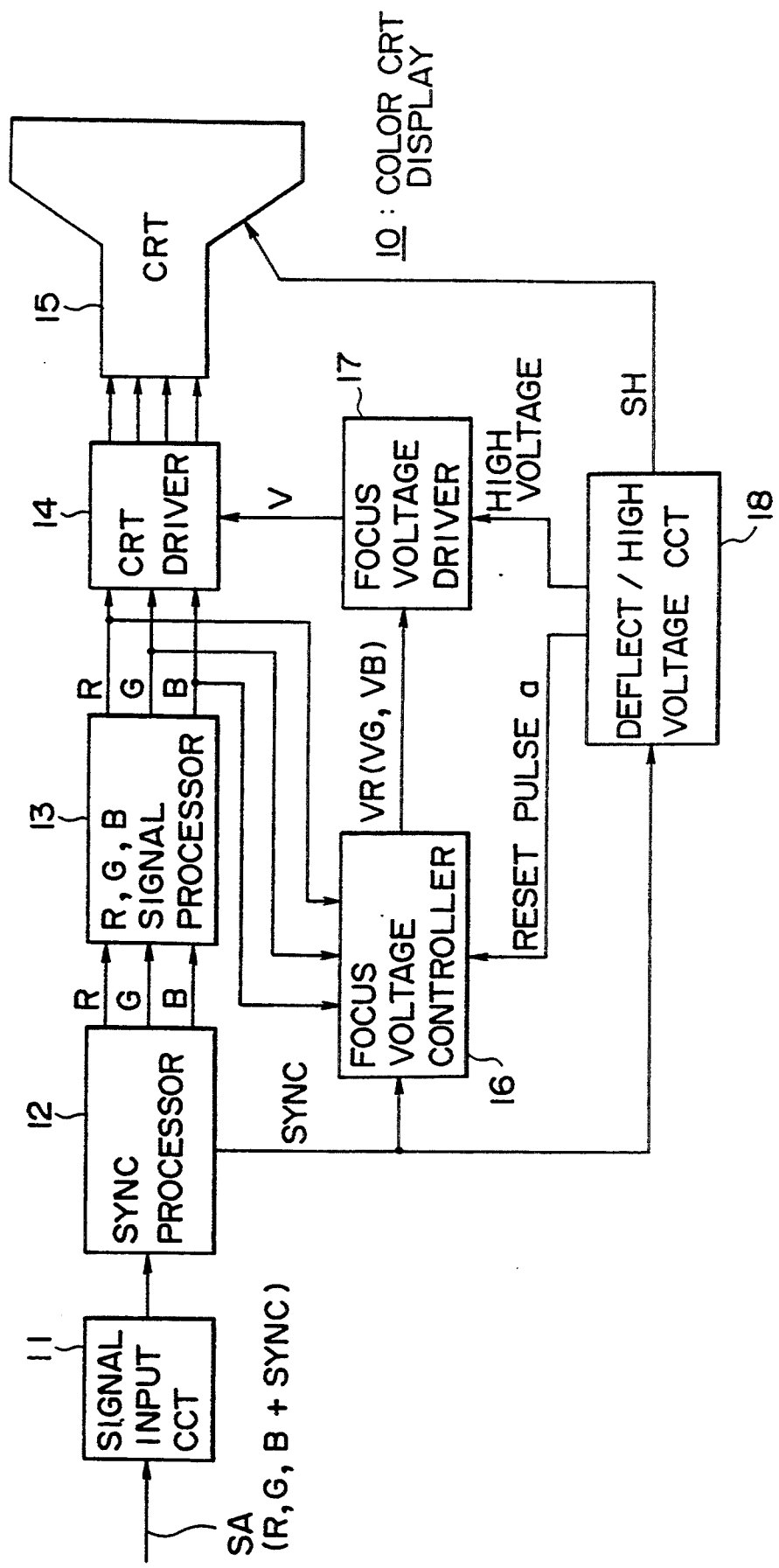
FIG. 1 is a system diagram of a color CRT display 10 to which a focus voltage control apparatus of the present invention is applied.

FIG. 1 is a system diagram showing a color CRT display 10 for computer graphics where the focus voltage control apparatus of the invention is applied. In this diagram, an input video signal SA supplied from, e.g., an unshown computer is composed of a red signal R, a green signal G, a blue signal B and a synchronizing signal SYNC. Such video signal SA is fed into a signal input circuit 11 of the color CRT display 10.

The video signal SA processed in the signal input circuit 11 is supplied to a sync processor 12, where the synchronizing signal SYNC is extracted from the video signal SA. The synchronizing signal SYNC thus extracted is supplied to a focus voltage controller 16 and a deflecting/high voltage circuit 18. In the sync processor 12, the color signals R, G, B are mutually separated and then are supplied to an R, G, B signal processor 13.

In the R, G, B signal processor 13, the color signals R, G, B are amplified to a higher level to be displayable on a CRT 15, and then are supplied to a CRT driver 14 and a focus voltage controller 16. As will be described later, the focus voltage controller 16 outputs one of color focus voltages VR, VG, VB in accordance with the amounts of the color signals R, G, B.

Figure 2:
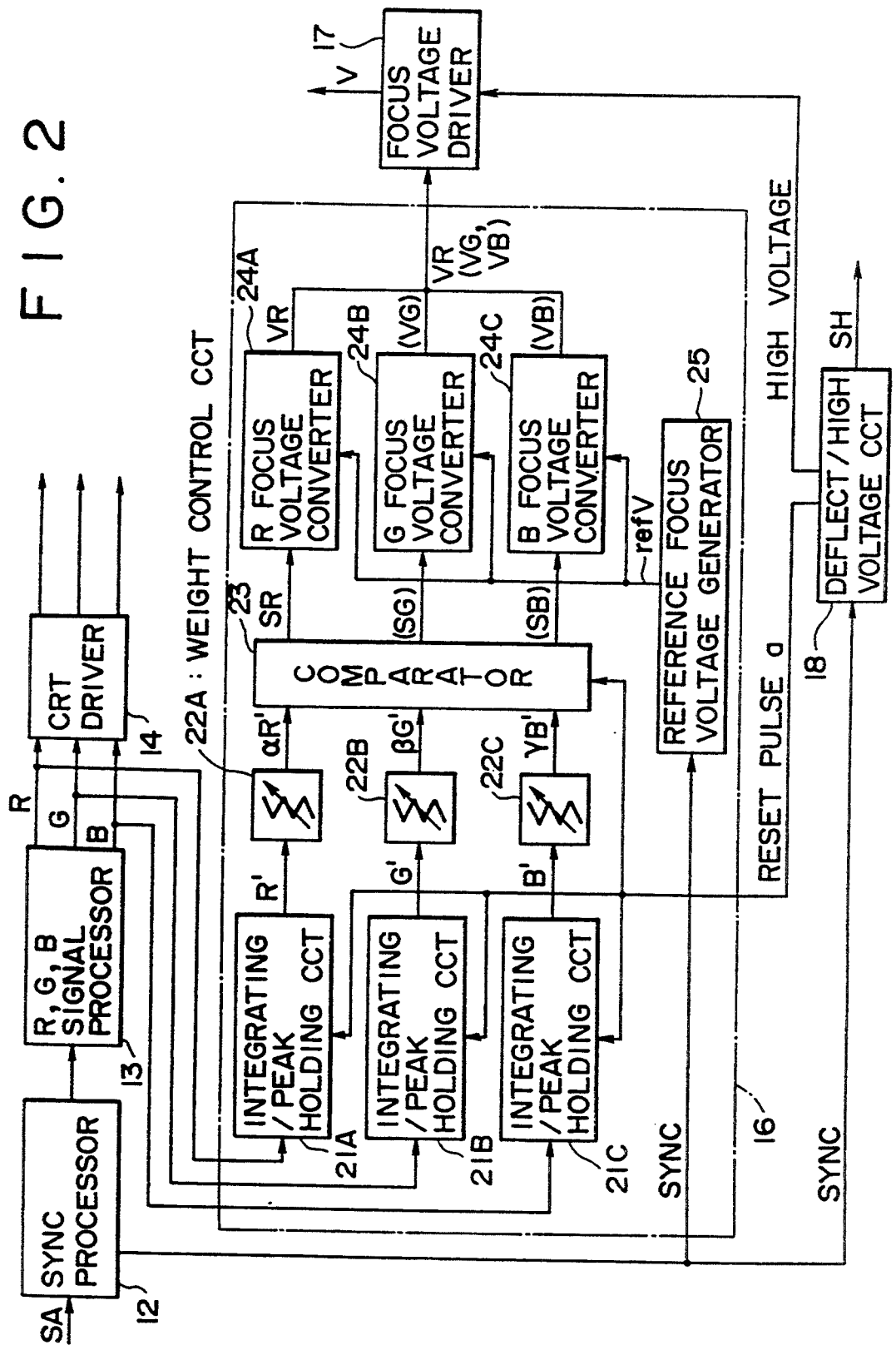
FIG. 2 is a block diagram of a focus voltage controller 16 employed in the apparatus of FIG. 1.

FIG. 2 is a block diagram of the focus voltage controller 16. In this diagram, the color signals R, G, B outputted from the R, G, B signal processor 13 are supplied respectively to integrating/peak holding circuits 21A–21C, where the individual color signals are integrated per horizontal line period and the resultant integral values are held.

The integral values R', G', B' of the color signals R, G, B thus held are supplied respectively to weight control circuits 22A–22C so as to be weighted respectively by predetermined weighting coefficients $\alpha$, $\beta$, $\gamma$. In this embodiment, for the purpose of rendering a white color distinct as in the conventional example, the weighting coefficient $\beta$ for the green signal G is set to be approximately twice the weighting coefficient $\alpha$ for the red signal R or the weighting coefficient $\gamma$ for the blue signal B. However, it is possible to modify such setting of the weighting coefficients $\alpha$, $\beta$, $\gamma$ as desired in compliance with any specific purpose of use or destination area of the product, whereby blue or red can be rendered more distinct with facility through the dispersive adjustment.

The weighted color signals $\alpha R'$, $\beta G'$, $\gamma B'$ are supplied to a comparator 23, where the maximum color signal is detected after mutual comparison of the three color signals. When the maximum color signal thus detected is a red signal $\alpha R'$, a red selection signal SR is outputted. Meanwhile, when the detected maximum color signal is a green signal $\beta G'$, a green selection signal SG is outputted. Similarly, when the maximum color signal is a blue signal $\gamma B'$, a blue selection signal SB is outputted.

The color selection signals SR, SG, SB outputted from the comparator 23 are supplied respectively to an R focus voltage converter 24A, a G focus voltage converter 24B and a B focus voltage converter 24C. The focus voltage converters 24A–24C also receive a reference focus voltage refV of FIG. 3(A) produced in a reference focus voltage generator 25.

The reference focus voltage refV is generated on the basis of the synchronizing signal SYNC supplied from the sync processor 12, and it is composed of pulses whose period is equal to one horizontal line period. Each pulse has a high level at its both ends for the reason that, since the travel distance of the electron beam in the CRT 15 is longer at both ends of the CRT 15 than that at the center thereof, the focus voltage needs to be higher when the electron beam travels to each end. In this embodiment, the reference focus voltage refV is set for just focusing the green signal G.

Figure 3:
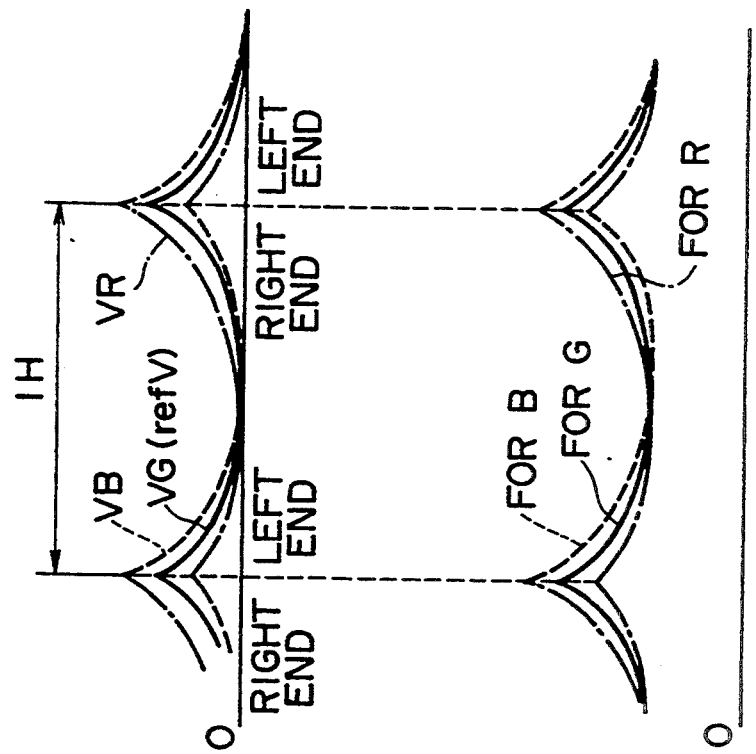
FIGS. 3A and 3B are a signal waveform charts of a reference focus voltage refV, color focus voltages VR, VG, VB, and a focus voltage V.

As shown in FIG. 2, the reference focus voltage refV is converted by the R focus voltage converter 24A into a red focus voltage VR of FIG. 3(A) which brings the red signal R into a just focused state. The red focus voltage VR is obtained by changing the waveform of the reference focus voltage refV in conformity with the characteristic of the red signal R. In this embodiment, the portion irradiated to the left end of the CRT is lower than the reference focus voltage refV, while the portion irradiated to the right end thereof is higher than the voltage refV, whereby the red signal R is just focused over the entire screen of the CRT 15.

Similarly in the G focus voltage converter 24B, the reference voltage refV is converted into a green focus voltage VG which brings the green signal G into a just focused state. In this embodiment, the reference focus voltage refV is outputted directly as a green focus voltage VG without any modification. Meanwhile in the B focus voltage converter 24C, the reference focus voltage refV is converted into a blue focus voltage VB which brings the blue signal B into a just focused state. The blue focus voltage VB has a higher level at the left end and a lower level at the right end, contrary to the red focus voltage VR.

The signal waveforms of the color focus voltages VR, VG, VB in the focus voltage converters 24A–24C are adjustable either manually or by the use of a microcomputer with visual inspection of the display condition on the CRT 15 at the time of manufacture of the color CRT display 10.

The red focus voltage VR, the green focus voltage VG or the blue focus voltage VB generated from the focus voltage converter 24A, 24B or 24C is supplied as an output of the focus voltage controller 16 to the focus voltage driver 17. More specifically, when the red signal R for example is the maximum in the video signal SA, the red focus voltage VR is outputted from the focus voltage controller 16.

As mentioned, the weighting coefficient $\beta$ for the green signal G is set to be approximately twice any of the other weighting coefficients $\alpha$ and $\gamma$. If the three color signals R, G, B are included equally in the video signal SA, the green selection signal SG is outputted from the comparator 23 so that the green focus voltage VG is obtained from the focus voltage controller 16. This is based on the fact that, since the human visual sensitivity is the keenest to green, compound colors are seen distinctly if the green is focused in a satisfactory state.

A reset pulse a is produced in the deflecting/high voltage circuit 18 in synchronism with the synchronizing signal SYNC and then is supplied to the integrating-/peak holding circuits 21A–21C and the comparator 23 of the focus voltage controller 16, whereby the color signals R, G, B are integrated and the integral values thereof are mutually compared every horizontal line period. Consequently, one of the color focus voltages VR, VG, VB is outputted every horizontal line period from the focus voltage controller 16.

Also in the deflecting/high voltage circuit 18, a deflection signal SH for deflecting the electron beam to a predetermined position in the CRT 15 is produced on the basis of the synchronizing signal SYNC and then is supplied to a deflecting coil (not shown) in the CRT 15. Further a high voltage is generated in the deflecting- /high voltage circuit 18 and then is supplied to the focus voltage driver 17.

Subsequently in the focus voltage driver 17, the color focus voltage VR, VG or VB supplied from the focus voltage controller 16 is shifted to a higher level to produce a focus voltage V for the color signal R, G or B as shown in FIG. 3(B), and such focus voltage V is supplied to the CRT driver 14.

Thereafter the color signals R, G, B amplified in the R, G, B signal processor 13 and the focus voltage V obtained from the focus voltage driver 17 are outputted via predetermined paths of the CRT driver 14 and are supplied to input pins of the CRT 15. Then in the CRT 15, the color signals R, G, B are deflected to desired positions on the basis of the deflection signal SH, whereby the video image is displayed properly. At this time, the maximum one of the color signals R, G, B included in the video signal SA is displayed in the just focused state.

Figure 4:
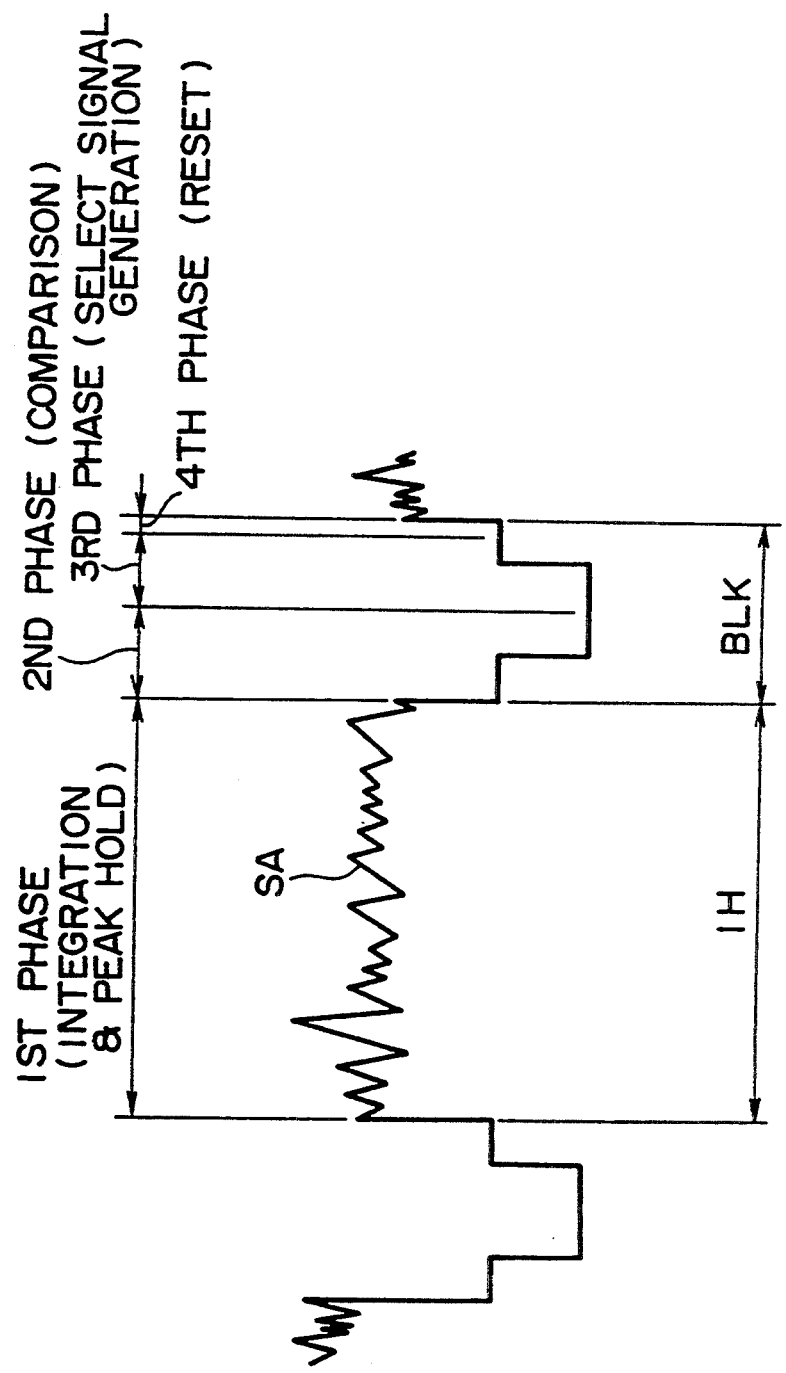
FIG. 4 is a diagram for explaining the operation timing of the focus voltage controller 16.

FIG. 4 is a diagram for explaining the operation timing of the above-described focus voltage controller 16. As shown, the operation timing is divided into four phases. In the first phase, the color signals R, G, B in a predetermined period, such as one horizontal line period in this embodiment, are integrated and the peak values thereof are held. The second through fourth phases correspond to the blanking period. In the second phase, the integral values of the color signals are weighted and compared with one another. Subsequently in the third phase, the maximum color signal is detected and then color selection signals SR, SG, SB are generated. And in the fourth phase, the component circuits are reset.

In the above embodiment, supply of the focus voltage V to the CRT 15 is performed when the signal line next to the one used for generation of the focus voltage V is supplied to the CRT 15. However, there arises no problem since the video signal SA has some redundancy.

By means of a delay circuit having a delay time equal to one horizontal line period, it is rendered possible to achieve complete synchronism of the focus voltage V with the video signal SA through delay of the video signal SA supplied to the CRT 15, so that a just-focused image can still be displayed properly even if the video signal SA has any sudden change in the vertical direction.

In the case of using the color CRT display for a computer, the signal to be displayed on the CRT 15 may be processed in the computer. Then it becomes possible to perform the series of operations digitally in the first through fourth phases, hence realizing complete synchronism of the focus voltage V with the video signal SA without the necessity of employing any delay circuit.

What is claimed is:

1. A color CRT display having a focus voltage controller, the controller comprising;
   a plurality of color signal detecting circuits for detecting respective color signals included in a predetermined period of an input color video signal;
   a plurality of weighting circuits for weighting the detected color signals respectively;
   a color signal comparator for outputting one of a respective plurality of color selection signals upon detecting a maximum one of the weighted color signals; and
   a respective plurality of converter circuits for each receiving one of said plurality of color selection signals and each generating a respective focus voltage for just focusing the color signal corresponding to the maximum one of the weighted color signals.

2. The color CRT display according to claim 1, wherein said predetermined period is one horizontal line period.

3. The color CRT display according to claim 2, wherein said color signals are a red signal, a green signal and a blue signal.

4. The color CRT display according to claim 3, wherein said color signal detecting circuits are integrating circuits or peak holding circuits.

5. The color CRT display according to claim 4, wherein said weighting circuits preferentially weight the green signal of the three color signals.

6. The color CRT display according to claim 5, wherein said weighting circuits are set so that a weighting coefficient of the green signal is approximately twice a weighting coefficient of the red signal or of the blue signal.

7. The color CRT display according to claim 6, wherein said color signal detecting circuits and said color signal comparator operate within one horizontal line period.

8. The color CRT display according to claim 7, wherein respective focus voltage is outputted from said plurality of converter circuits within one horizontal line period after said detection and comparison.

9. A focus voltage control apparatus for a color CRT display, comprising:
   a plurality of color signal detecting circuits for detecting respective color signals included in a predetermined period of an input color video signal;
   a plurality of weighting circuits for weighting the detected color signals respectively;
   a color signal comparator for outputting one of a respective plurality of color selection signals upon detecting a maximum one of the weighted color signals; and
   a respective plurality of converter circuits each receiving one of said plurality of color selection signals and generating a respective focus voltage for just focusing the color signal corresponding to the maximum one of the weighted color signals.

10. The apparatus according to claim 9, wherein said predetermined period is one horizontal line period.

11. The apparatus according to claim 10, wherein said color signals are a red signal, a green signal and a blue signal.

12. The apparatus according to claim 11, wherein said color signal detecting circuits are integrating circuits or peak holding circuits.

13. The apparatus according to claim 12, wherein said weighting circuits preferentially weight the green signal of the three color signals.

14. The apparatus according to claim 13, wherein said weighting circuits are set so that a weighting coefficient of the green signal is approximately twice a weighting coefficient of the red signal or of the blue signal.

15. The apparatus according to claim 14, wherein said color signal detecting circuits and said color signal comparator operate within one horizontal line period.

16. The apparatus according to claim 15, wherein the respective focus voltage is outputted from said plurality of converter circuits within one horizontal line period after said detection and comparison.

* * * * *